Oct. 30, 1956  W. L. BOND  2,768,557
UNIAXIAL CRYSTAL ELECTRIC LIGHT VALVE COMPENSATED
FOR DIVERGENT LIGHT
Filed Oct. 6, 1952  3 Sheets-Sheet 1

INVENTOR
W. L. BOND
BY N. D. Ewing
ATTORNEY

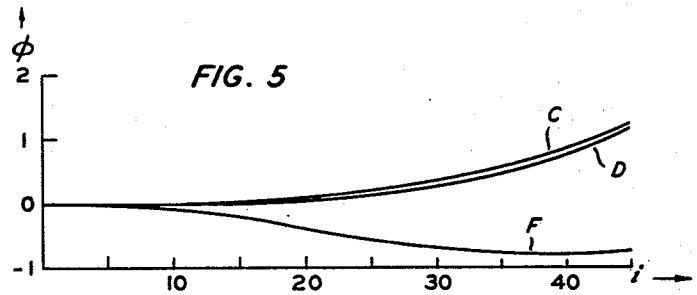
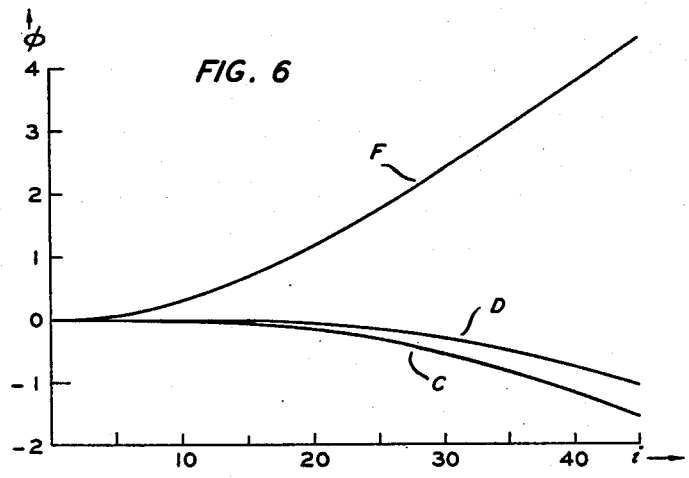
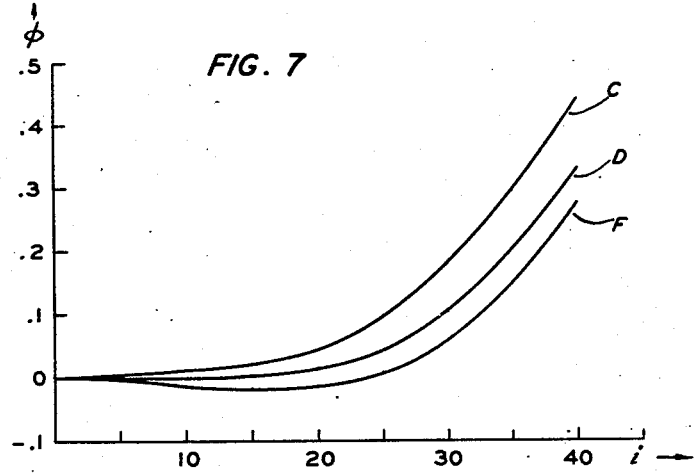

Oct. 30, 1956 W. L. BOND 2,768,557
UNIAXIAL CRYSTAL ELECTRIC LIGHT VALVE COMPENSATED
FOR DIVERGENT LIGHT
Filed Oct. 6, 1952 3 Sheets-Sheet 3

INVENTOR
W. L. BOND
BY
N. S. Ewing
ATTORNEY

United States Patent Office 2,768,557
Patented Oct. 30, 1956

2,768,557

UNIAXIAL CRYSTAL ELECTRIC LIGHT VALVE COMPENSATED FOR DIVERGENT LIGHT

Walter L. Bond, New Providence, N. J., assignor to Bell Telephone Laboratories, Incorporated, New York, N. Y., a corporation of New York Application October 6, 1952, Serial No. 313,336

2 Claims. (Cl. 88—61)

This invention relates in general to electro-optic apparatus and more particularly to light valves comprising birefringent electro-optically active crystalline materials.

A ray of light from a small dimensional source passing through a basal cut uniaxial birefringent crystal positioned between crossed polarizers, produces a concentric ring pattern on an interposed screen, such that the rings are crossed by a pair of dark radial bands. If the crystal is electro-optically active, as is for example ammonium dihydrogen phosphate, the application of an electric field along the optic axis, in the direction of crystal thickness, distorts the pattern, changing the circles into ellipses, and the dark cross into a pair of hyperbolae slightly separated at the bases. Thus, a small aperture in the center of the screen passes no light in the absence of the electric field, but does pass light when the field is applied displacing the dark cross. An electro-optical light valve operating on the principle described above is disclosed in W. P. Mason Patent 2,467,325, April 12, 1949.

The useful aperture size in such a light valve is limited by the size of the first ring of the pattern cast on the screen. Although this ring size can be increased by reducing the thickness of the crystal, such a procedure may be disadvantageous, since a certain minimum thickness (of the order of a quarter of an inch in amomnium dihydrogen phosphate) is required to sustain the applied voltage without fracture.

Accordingly, a general object of the present invention is to provide improved characteristics in a light valve of the type described. More particular objects of the invention are to provide in a light valve of the type described a significant increase in the allowable divergence of the incident polarized light beam and a decrease in the chromatic dispension thereof.

A ray of light passing through a basal cut uniaxial crystal breaks up into a radially vibrating component and a tangentially vibrating component which travel with different velocities. On emerging from the crystal these components recombine. Assuming that the crystal is positioned between a crossed polarizer and analyzer, if the vector sum of the component rays lies along the extinction direction of the analyzer, the intensity upon the screen is zero.

The tangentially vibrating component is known as the ordinary ray, designated $\omega$, below its velocity of propagation is the same for all directions of propagation. The radially vibrating ray is known as the extraordinary ray, designated $\epsilon$, because its velocity of propagation varies with the dierction of propagation, being equal to the ordinary velocity for rays traveling along the optic axes.

Unilateral birefringent crystals are divided into two classes, designated optically positive and optically negative. For the positive uniaxial crystals, the ordinary velocity is greater than the extraordinary velocity, whereas for negative uniaxial crystals, the reverse is true.

In accordance with the present invention the divergence and chromatic aberration in a light valve, of the general type described in United States Patent 2,467,325, supra, comprising an optically active birefringent Z-cut crystal interposed between crossed-polarizers with its major faces disposed transversely to the intercepted beam, is compensated by interposing in tandem with the initial crystal in the path of the transmitted beam, one or more additional crystals of opposite optical sign and proper thickness. By this device, the first ring falling on the screen can be made very large; and hence the allowable divergence of the incident polarized beam is markedly increased. If, for example, the first, electro-optic crystal is ammonium dihydrogen phosphate, which is an optically negative uniaxial crystal, a positive uniaxial crystal having a thickness computed in accordance with the techniques described hereinafter should be chosen to compensate it. Such a compensating crystal should be clear and colorless, and should not rotate the plane of polarization. Its refractive indices should not differ too greatly from those of ammonium dihydrogen phosphate.

For the purposes of the present exposition, zinc fluosilicate ($ZnSiF_6 \cdot 6H_2O$) has been chosen because, although its indices are not quite the same as those of ammonium dihydrogen phosphate, it is one of the few positive uniaxial crystals for which the literature gives refractive indices for more than one color of light.

Since the source is not monochromatic to compensate for chromatic aberration as will be described hereinafter, an additional crystalline component comprising potassium periodate ($KIO_4$) is added.

In one embodiment of the invention, rectangular Z-cut crystals of ammonium dihydrogen phosphate, potassium periodate, and zinc fluosilicate, each having its major surfaces perpendicular to its Z axis and having respective thicknesses in a Z direction of 3.5 millimeters, 1.947 and 7.6 millimeters, are placed together in tandem. A pair of electrode films, transparent to permit the passage of light, are evaporated onto opposing X—Y surfaces of the ammonium dihydrogen phosphate crystal and connected to an electrical source for applying a controlling field.

It will be apparent from the discussion hereinafter that a light valve comprising the composite crystal unit indicated has superior characteristics, both as to the allowable divergence of the incident polarized beam, and the decrease in chromatic dispersion. Such characteristics may make possible the application of the light valve of the present invention to various types of switching operations.

Other objects, advantages, and features of the present invention will be apparent from a study of the specification hereinafter and the attached drawing, in which Fig. 1 shows an electro-optical light valve of the general type disclosed in W. P. Mason Patent 2,467,325;

Fig. 5 shows a series of three curves C, D, and F for different spectral lines indicating the color response of a uniaxial crystal of ammonium dihydrogen phosphate compensated by a crystal of zinc fluosilicate;

Fig. 6 shows a series of three curves for the same spectral lines as Fig. 5, using a uniaxial crystal of ammonium dihydrogen phosphate compensated with a crystal of potassium periodate;

Fig. 7 shows a series of three curves using the same spectral lines as indicated in Figs. 5 and 6, using a triple-element crystal compensator including uniaxial crystals of ammonium dihydrogen phosphate, zinc fluosilicate, and potassium periodate;

Figure 10:
Figure 11:
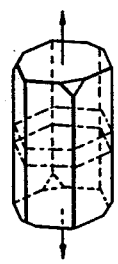
Figure 12:
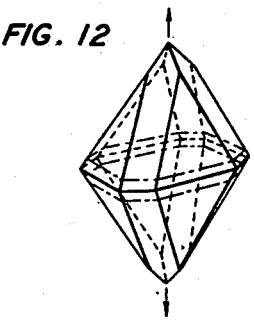
Figure 13:
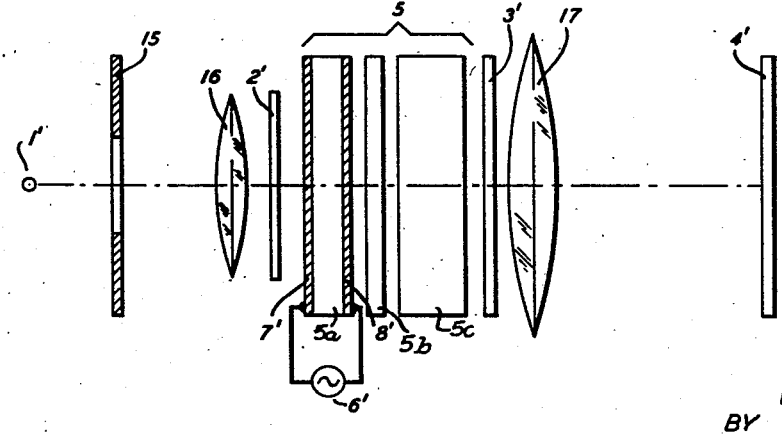

Figs. 10, 11, and 12 are showings of the crystalline habits respectively of ammoninum dihydrogen phosphate, zinc fluosilicate, and potassium periodate; and Fig. 13 is a showing in cross section of a divergence and color compensated light valve assemblage in accordance with the present invention.

Figure 1:
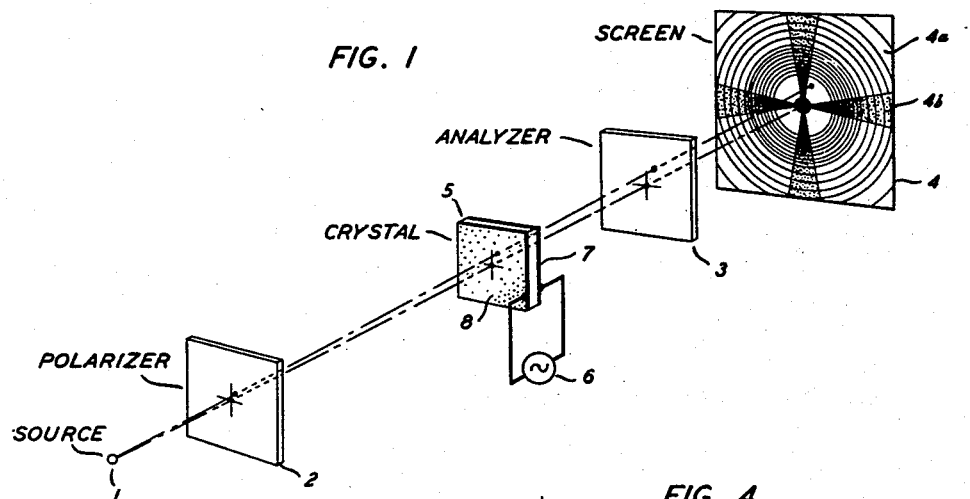

The electro-optical light valve of Fig. 1 is of the general type indicated in W. P. Mason Patent 2,467,325.

Referring in detail to Fig. 1, a beam of light is supplied from a source 1. Aligned transversely in the path of the beam from the source 1 are a polarizer 2 and an analyzer 3, which may be of any of the forms well known in the art, such as Nicol prisms, or plates of material known commercially as "Polaroid." The polarizer 2 and analyzer 3 are set for extinction of the beam passing through their thicknesses. A screen 4 is coaxially aligned with the plates 2 and 3, in a parallel plane beyond the analyzer. Interposed between plates 2 and 3 is a uniaxial birefringent crystal such as, for example, ammonium dihydrogen phosphate, the major surfaces of which are substantially parallel to each other and normal to the Z axis.

Elecertodes 7 and 8, which serve to apply an electrical stress from the alternating-current source 6, are adhered to opposing major surfaces of the crystal 5. These electrodes 7 and 8 are designed to permit the passage of light, and hence, may assume the form of transparent metallic films, e. g. gold 50 to 100 angstroms thick, evaporated on the crystal surfaces. The process for preparing such evaporated metallic electrodes is described in detail in Chapter IV of "Procedures in Experimental Physics" by John Strong, Prentice Hall, 1939. Alternatively the electrodes may assume the form shown in Fig. 5 of Mason Patent 2,467,325, supra, comprising a pair of grids of conductive material such as metallic mesh, or wires, or a metallic paint secured on the major faces of the crystal element 5. Electrodes 7 and 8 are connected by lead wires to the electrical control source 6.

Figure 2:
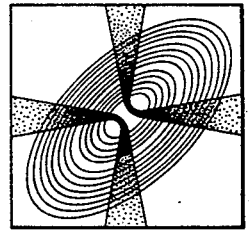
Fig. 2 shows a variation in the pattern appearing on the screen included in the light valve of Fig. 1 of the drawings.

In the absence of an applied electrical field, a beam of light from the source 1 passing through the crossed polarizing plates 2 and 3 along the optic axis of the ammonium dihydrogen phosphate crystal 5 produces on the screen 4 a pattern of concentric interference rings 4a of the type well known in the art, superposed on which is an additional pattern in the nature of a dark cross 4b concentric with the pattern of rings. When a field is applied from the electrical source 6 along the optic axis of the crystal 5, the ring pattern 4a is changed in the manner shown in Fig. 2 of the drawings, becoming elliptical, and the arms of the dark cross 4b are separated forming a pair of hyperbolae spaced apart by a bright spot.

As pointed out in the introductory paragraphs of the specification, a light valve providing a greater angle of divergence for the incident beam would be possible if the size of the rings were increased. In accordance with the present invention, this is accomplished by placing in tandem with the uniaxial birefringent crystal 5, which in the present illustrative example is ammonium dihydrogen phosphate, an electro-optically negative crystal, and one or more compensating electro-optically positive crystals. Since zinc fluosilicate (ZnSiF$_6$·6H$_2$O) is one of the few positive uniaxial crystals for which the literature gives values of the refractive indices for more than one color of light, it has been found to be a useful material for the purposes of the present invention.

For ammonium dihydrogen phosphate the International Critical Tables, volume VII, page 19 gives the following values:

| $\lambda$ | $\omega$ | $\epsilon$ |
| --- | --- | --- |
| .486 F | 1.5314 | 1.4847 |
| .589 D | 1.5246 | 1.4792 |
| .656 C | 1.5212 | 1.4768 | where $\lambda$ is the wave length in microns, $\omega$ is the index of refraction for the ordinary ray, $\epsilon$ is the index of refraction for the extraordinary ray and the letters F, D, and C are well-known Fraunhofer designations. On the other hand, for zinc fluosilicate, P. Groth's Chemische Kristallographie, Engelmann, 1906, volume I, page 599 gives the following values:

| $\lambda$ | $\omega$ | $\epsilon$ |
| --- | --- | --- |
| .486 F | 1.3860 | 1.3992 |
| .589 D | 1.3824 | 1.3956 |
| .656 C | 1.3808 | 1.3938 |

Figure 3:
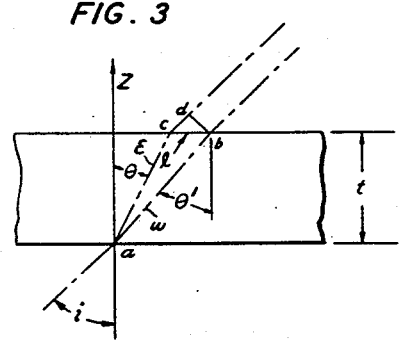
Fig. 3 is a cross-sectional diagram for definition of terms in the formulae set forth in describing the present invention.

An approximate theory can be built around M. Bertin's formula (Preston, Theory of Light, 4th edition, The MacMillan Co., 1912, pages 408 and 410). Consider a uniaxial crystal illustrated diagrammatically in enlarged cross secction in Fig. 3 of the drawing. If a ray with an angle of incidence $i$ is refracted so that it passes at angle $\theta$ to the optic axis, which is perpendicular to the major faces of the crystal, the phase difference of the two components upon emerging is:

$$\varphi = \frac{Bl}{\lambda} \quad (1)$$

where B is the difference of refractive indices for this direction of propagation (i. e. the birefringence), $l$ is the path length and $\lambda$ is the wave length in air, $\varphi$ being the phase difference in waves. Obviously $$l = \frac{t}{\cos \theta}$$

Bertin's formula states that $$B \doteq B_0 \sin^2 \theta \quad (2)$$

where $B_0 = \epsilon - \omega$ (for a beam directed along the optic axis) whence $$\varphi \doteq \frac{B_0 t \sin^2 \theta}{\lambda \cos \theta}$$

But $$\omega \sin \theta = \sin i \quad (3)$$

whence $$\varphi \doteq \frac{B_0 t}{\lambda \omega} \frac{\sin i}{\sqrt{\omega^2 - \sin^2 i}} \quad (4)$$

For ammonium dihydrogen phosphate in sodium light (the Fraunhofr D line), $B_0 = 1.4792 - 1.5246 = -.0454$, $\omega = 1.5246$, $\lambda = 0.5893$ microns. Hence, if the thickness is 3530 microns (3.53 millimeters) the phase difference becomes $$\varphi = \frac{-178.3 \sin^2 i}{\sqrt{2.324 - \sin^2 i}}$$

Figure 4:
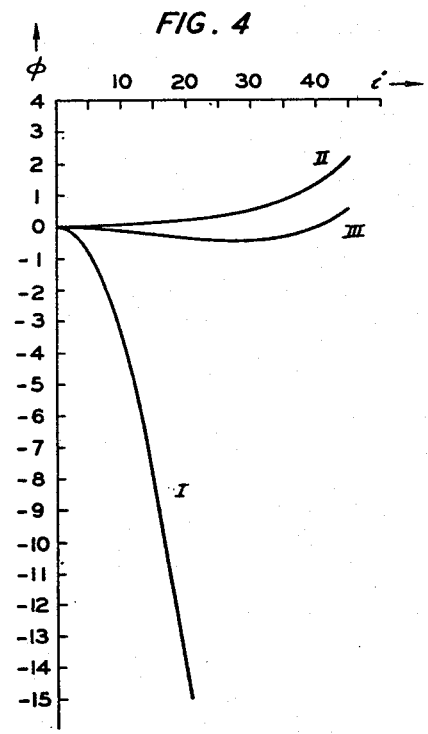
Fig. 4 is a plot for sodium light of phase-divergence curves I, II, and III for compensators including respectively ammonium dihydrogen phosphate alone, zinc fluosilicate crystal alone, and a composite of the two using sodium light.

Evaluating this for angles of incidence $i = 2, 4, 6 \ldots 16$ degrees, curve I of Fig. 4 is obtained.

Let us now consider an ammonium dihydrogen phosphate crystal or thickness $t_a$, ordinary ray refractive index $\omega_a$, birefringence $\epsilon_a - \omega_a = B^a{}_0$; and also a zinc fluosilicate crystal of thickness $t_z$, ordinary index $\omega_z$ birefringence $\epsilon_z - \omega_z = B_0{}^z$. The resultant phase difference of the combination is the sum of the phase differences of the components, that is:

$$\Phi = \varphi_a + \varphi_z \qquad (5)$$

or $$\Phi \doteq \frac{B_0{}^a t_a \sin^2 i}{\lambda \omega_a \sqrt{\omega_a{}^2 - \sin^2 i}} + \frac{B_0{}^z t_z \sin^2 i}{\lambda \omega_z \sqrt{\omega_z{}^2 - \sin^2 i}} \qquad (6)$$

which is zero if $$\frac{B_0{}^a t_a}{\omega_a \sqrt{\omega_a{}^2 - \sin^2 i}} + \frac{B_0{}^z t_z}{\omega_z \sqrt{\omega_z{}^2 - \sin^2 i}} = 0 \qquad (7)$$

For small angles of incidence $i$, Equation 7 is a good approximation if the thickness ratio is $$\frac{t_a}{t_z} = -\frac{B_0{}^z \omega_a{}^2}{B_0{}^a \omega_z{}^2} \qquad (8)$$

For ammonium dihydrogen phosphate and zinc fluosilicate in sodium light, Equation 8 gives $$\frac{t_a}{t_z} = \frac{-.0132 \times 1.5246^2}{-.0454 \times 1.3824^2} = 0.353$$

Whence if $t_z = 10$ millimeters, then $t_a$ should be 3.53 millimeters, the value chosen for curve I, Fig. 4. By using the approximate formula, Equation 6, the approximate relationship between $\varphi$ and $i$ can now be computed. Substituting these values in Equation 6:

$$\Phi = \left( \frac{-.0454 \times 3530}{1.525\sqrt{2.323 - \sin^2 i}} + \frac{.0132 \times 10000}{1.382\sqrt{1.911 - \sin^2 i}} \right) \frac{\sin^2 i}{0.5893}$$

$$\Phi = \left( \frac{-178.3}{\sqrt{2.323 - \sin^2 i}} + \frac{162.0}{\sqrt{1.911 - \sin^2 i}} \right) \sin^2 i$$

This equation is represented by curve II, Fig. 4. It is apparent that while the first ring of the uncompensated crystal comes at about 5.2 degrees from the axis, the compensated one comes at about 36 degrees. The phases are reversed in the two curves; that is, in the uncompensated curve there is one more ordinary wave length in the crystal than extraordinary wave length at $i = 5.2$ degrees; while at $i = 36$ degrees in the compensated crystal, there is one more extraordinary wave length than ordinary wave length.

Equation 6 can be solved for $\Phi = 0$ at some arbitrary value of $i$, to make $\Phi$ smaller over a selected range. For example, if $\Phi = 0$ at $i = 20$ degrees, the curve will fall very slightly below zero at $i = 10$ degrees, rise to zero at $i = 20$ degrees, then rise more steeply than curve II. This curve has a very small $\Phi$ values out to $i = 30$ degrees.

Inasmuch as curve II is only valid for a single frequency, the next step is to investigate the changes in compensation due to a change of wave length of the light. Using the crystal data for the Fraunhofer F line, $\lambda = 0.486\mu$, $\Phi$ values are computed as before, to obtain curve III, Fig. 4. Hence, it is apparent that the divergence compensation does depend on color. To achromatize the divergence compensator, the Bertin's approximate equation is dropped, and a more accurate equation, which is an approximation superior to Bertin's equation is adopted. This follows:

$$\Phi = \frac{\omega t}{\lambda} \left( \sqrt{1 - \frac{\sin^2 i}{\epsilon^2}} - \sqrt{1 - \frac{\sin^2 i}{\omega^2}} \right) =$$

$$\frac{(\epsilon - \omega)(\epsilon + \omega) t \sin^2 i}{\lambda \left( \sqrt{1 - \frac{\sin^2 i}{\omega^2}} + \sqrt{1 - \frac{\sin^2 i}{\epsilon^2}} \right) \epsilon^2 \omega} \qquad (9)$$

Let $$f = \frac{(\epsilon - \omega)(\epsilon + \omega)}{2 \lambda \omega \epsilon^2} \text{ and } \delta = \tfrac{1}{4}\left( \frac{1}{\omega^2} + \frac{1}{\epsilon^2} \right) \qquad (10)$$

then $$\varphi = ft \sin^2 i + ft\delta \sin^4 i + \ldots \qquad (11)$$

where $f$ and $\delta$, for any given material, depends on $\omega$, $\epsilon$, and $\lambda$. These constants are computed for three crystals below.

| Crystal | $\lambda$ (microns) | $\omega$ | $\epsilon$ | $f$ | $\delta$ |
|---|---|---|---|---|---|
| NH$_4$H$_2$PO$_4$ | | | | | |
| Ammonium dihydrogen phosphate (tetragonal, colorless indices 1.525 and 1.479). | F .4861<br>D .5893<br>C .6563 | 1.5314<br>1.5246<br>1.5212 | 1.4847<br>1.4792<br>1.4768 | −.04293<br>−.03469<br>−.03058 | .220<br>.222<br>.223 |
| ZnSiF$_6$·6H$_2$O | | | | | |
| Zinc fluosilicate (Hexagonal prisms, colorless). | F .4861<br>D .5893<br>C .6563 | 1.3860<br>1.3824<br>1.3808 | 1.3992<br>1.3956<br>1.3938 | .013951<br>.011556<br>.010251 | .258<br>.259<br>.260 |
| KIO$_4$ | | | | | |
| Potassium periodate (tetragonal, colorless). | F .4861<br>D .5893<br>C .6563 | 1.6346<br>1.6205<br>1.6151 | 1.6651<br>1.6479<br>1.6416 | .022850<br>.017272<br>.015114 | .184<br>.188<br>.189 |

(The KIO$_4$ data is from the International Critical Tables, volume VII, page 27.)

In the foregoing table, $\lambda$ represents wavelength in microns, $\omega$ and $\epsilon$, the indices of refraction for the ordinary and extraordinary rays respectively, and $f$ and $\delta$ are defined in Equations 10.

Whence, to compensate ammonium dihydrogen phosphate by means of ZnSiF$_6$·6H$_2$O, for small angles of incidence $i$, for light corresponding to the sodium D line, one may use the equation:

$$f_a t_a + f_z t_z = 0$$

or $$-.03469 t_a + .011556 t_z = 0$$

so that $$t_z = \frac{.03469}{.011556} t_a$$

or $$t_z = 3.0 t_a$$

This value differs somewhat from that derived from Bertin's formula, being more accurate than the old value. Assume that $t_a = 3500$ microns, $t_z = 10500$ microns.

Whence one has now:

$\varphi_D = (-.03469 \times 3500 \times .011556 \times 10500) \sin^2 i +$
$(-.03469 \times 3500 \times .222 + .011556 \times 10500 \times .259) \sin^4 i$ Whence $$\varphi_D = .08 \sin^2 i + 4.37 \sin^4 i$$

which is plotted as curve D, Fig. 6.

For the F line, one has $\varphi_F = (-.04293 \times 3500 + .013951 \times 10500) \sin^2 i +$
$(-.04293 \times 3500 \times .220 + .013951 \times 10500 \times .358) \sin^4 i$ or $$\varphi_F = -3.77 \sin^2 i + 19.38 \sin^4 i$$

This is curve F, Fig. 5 of the drawing. Curve C is drawn similarly for the C line.

If the indices of the compensating crystal had been higher than those of ammonium dihydrogen phosphate instead of lower, the F curve might have been above the C curve instead of below. For example, for KIO$_4$, for the D line to be compensated for small angles of incidence, one finds:

$$-.03469 t_a + .017272 t_k = 0$$

or $$t_k = \frac{.03469}{.017272} t_a = 2.01 t_a$$

Let $t_a = 3500$ microns, then $t_k = 7030$ microns.

Whence $$D\varphi = (-.03469 \times 3500 \times .222 + \\ .017272 \times 7030 \times .188) \sin^4 i$$

$$\varphi_D = -4.1 \sin^4 i$$

which shows the reversal, as $\varphi_D$ is negative, whereas $\varphi_D$ was positive for the previous case. For the F line one has:

$$\varphi_F = (-.04293 \times 3500 + .022850 \times 7030) \sin^2 i + \\ (-.04293 \times 3500 \times .220 + .022850 \times 7030 \times .184) \sin^4 i$$

$$\varphi_F = 10.7 \sin^2 i - 3.5 \sin^4 i$$

which is plotted as curve F, Fig. 6.

At angle of incidence, $i = 20°$, the F value for this last pair is 3.1 times as large as for the first combination, but opposite in sign. Hence, if the two thicknesses are divided by 3.1 and added to the first pair, the composite gives good compensation at $i = 20°$. This gives $$\left(3500 + \frac{3500}{3.1}\right) =$$

4630 microns of ammonium dihydrogen phosphate, 10500 microns of $ZnSiF_6 \cdot 6H_2O$ and $$\frac{7030}{3.1} = 2270 \text{ microns of } KIO_4$$

To keep the electric breakdown conditions comparable with previous conditions, each thickness should be multiplied by $$\frac{3500}{4630} = 0.755$$

to give 3500 microns of ammonium dihydrogen phosphate, 7930 microns of $ZnSiF_6 \cdot 6H_2O$, and 1715 microns of $KIO_4$. For this triple system, the phase relations are:

$$\Phi_D = (-.03469 \times 3500 + .011556 \times 7930 + \\ .017272 \times 1715) \sin^2 i + (-.03469 \times 3500 \times .222 + \\ .011556 \times 7930 \times .259 + .017272 \times 1715 \times .188) \sin^4 i$$

or $$D\varphi = -.155 \sin^2 i + 2.350 \sin^4 i$$

$$\varphi_F = (-.04293 \times 3500 + .013951 \times 7930 + .02285 \times \\ 1715) \sin^2 i + (-.04293 \times 3500 \times .220 + .013951 \times \\ 7930 \times .258 + .02285 \times 1715 \times .184) \sin^4 i$$

$$\varphi_F = -.446 \sin^2 i + 2.685 \sin^4 i$$

$$\varphi_C = (-.03058 \times 3500 + .010251 \times 7930 \times .015114 \times \\ 1715) \sin^2 i + (-.03058 \times 3500 \times .223 + .010251 \times \\ 7930 \times .260 + .015114 \times 1715 \times .189) \sin^4 i$$

$$\varphi_C = -0.0 \sin^2 i + 2.1 \sin^4 i$$

These equations are respectively plotted for progressively increasing angles of incidence as curves D, F, and S in Fig. 7. It is seen that the compensation is so good in the major part of the visible spectrum, that the errors do not exceed a quarter wave unless the angle of incidence $i$ is greater than 35 degrees.

Another more accurate method for computing the relative thicknesses of the crystal plates to be added in tandem as follows: If plates of ammonium dihydrogen phosphate, zinc fluosilicate, and potassium periodate of thicknesses $t_a$, $t_z$, and $t_k$ respectively are placed in tandem, the phase difference between emergent ordinary and extraordinary rays for the C, D, and F Fraunhofer lines of light is represented by substitutions in Equation 11 in the manner carried out in previous computations:

$$\Phi_C = -.03058 t_a \sin^2 i - .03058 \times .223 t_a \sin^4 i \\ + .010251 t_z \sin^2 i + .010251 \times .260 t_z \sin^4 i \\ + .015114 t_k \sin^2 i + .015114 \times .189 t_k \sin^4 i$$

$$\Phi_D = -.03469 t_a \sin^2 i - .03469 \times .222 t_a \sin^4 i \\ + .011556 t_z \sin^2 i + .011556 \times .259 t_z \sin^4 i \\ + .017272 t_k \sin^2 i + .017272 \times .188 t_k \sin^4 i$$

$$\Phi_F = -.04293 t_a \sin^2 i - .04293 \times .220 t_a \sin^4 i \\ + .013951 t_z \sin^2 i + .013951 \times .258 t_z \sin^4 i \\ + .02285 t_k \sin^2 i + .02285 \times .184 t_k \sin^4 i$$

If the D line is compensated for small values of $i$, $\sin^4 i$ in the $\Phi_D$ equation may be neglected, and the remaining term set equal to zero.

$$\Phi_D = (-.03469 t_a + .01156 t_z + .017272 t_k) \sin^2 i = 0$$

whence $$-.03469 t_a + .011556 t_z + .017272 t_k = 0$$

Now, assume $\Phi_F = \Phi_C$, for $i = 20°$. This gives the equation:

$$-.001481 t_a + .000445 t_z - .0009234 t_k = 0 \qquad (12)$$

Solving Equations 2 and 3 for $t_z$ and $t_k$ in terms of $t_a$ gives $$t_z = 2.171 t_a, \quad t_k = 0.556 t_a$$

whence if $t_a = 3500$ microns, then $t_z = 7600$ microns, and $t_k = 1947$ microns. These values, placed in the equations for $\Phi_C$, $\Phi_D$ and $\Phi_F$, show the degree of compensation of $\Phi$ for both in angle and color:

$$\Phi_C = 0.30 \sin^2 i + 1.95 \sin^4 i$$
$$\Phi_D = 2.11 \sin^4 i$$
$$\Phi_F = 0.24 \sin^2 i + 2.48 \sin^4 i$$

Figure 9:
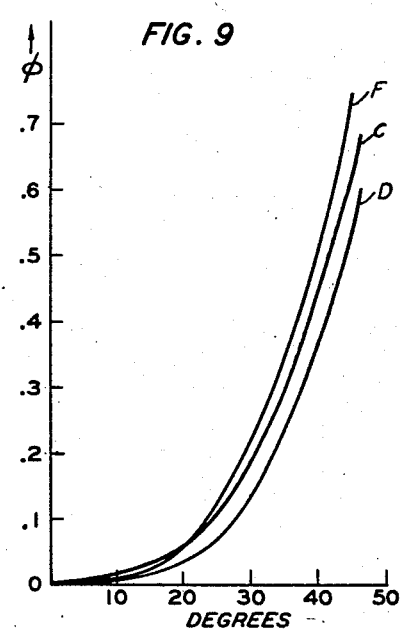
Fig. 9 shows a series of three curves for different spectral lines treated above showing the divergence and color response of a compensator in accordance with Fig. 8.

These equations are respectively plotted for progressively increasing angles of incidence as curves C, D and F in Fig. 9 of the drawings. It is seen that the phase is wrong by a quarter wave, only if $i$ exceeds 30 degrees, and that this holds for all colors from blue ($\lambda = .4861$ microns) to red ($\lambda = .6563$ microns).

The compensation for dispersion and chromatic aberration achieved in the manner described hereinbefore could probably be achieved with a single compensator, instead of two, were there available in the art a crystal having the same $\delta$ value as ammonium dihydrogen phosphate, uniaxial, colorless, and without rotation. However, since such a crystal is not at present available, a composite compensator must be employed for providing the wide-angle, color-corrected light valve described.

Figure 8:
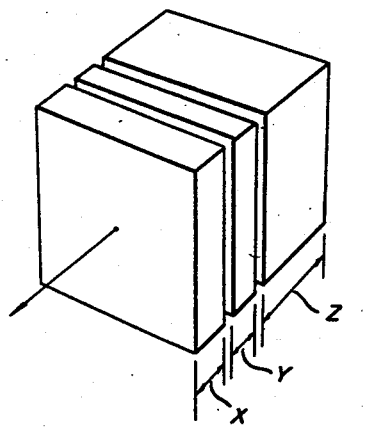
Fig. 8 shows the proportions of the compensated crystal element including ammonium dihydrogen phospate, potassium periodate, and zinc fluosilicate, the thicknesses of which are computed in accordance with the formulae disclosed.

For preparing such a compensator, crystal plates $5a$, $5c$, and $5b$ as indicated in Fig. 8, of the requisite thicknesses, are cut from mother crystals of ammonium dihydrogen phosphate, zinc fluosilicate and potassium periodate, of the forms despectively indicated in Figs. 10, 11, and 12 of the drawings. The ammonium dihydrogen phosphate and potassium periodate crystallize in tetragonal form, whereas the sodium fluosilicate crystallizes in hexagonal form, each with the Z axis running the length of the crystal. Each of the plates, $5a$, $5b$, and $5c$ is a so-called Z-cut crystal, the major faces being normal to the Z (optic) axis of the crystal. The two major surfaces of each of the crystals are made parallel and are polished in a manner well known in the art.

For example, if the dimensions are chosen in accordance with the method of computations last described, Z-cut crystal elements are cut with the following thickness dimensions:

$5a$—ammonium dihydrogen phosphate—3.5 millimeters.
$5b$—potassium periodate—1.947 millimeters.
$5c$—zinc fluosilicate—7.6 millimeters.

These three elements $5a$, $5b$, and $5c$, are assembled with the elements previously described with reference to Fig. 1 of the drawings to form a divergence-color compensated light valve, which is indicated in cross section in Fig. 13 of the drawings. This comprises the source $1'$ which is focused centrally on an opening in a baffle 15. A lens 16 centrally located on the other side of the baffle 15, receives beam passing through the opening and serves to focus the beam on the optical assembly including the crystal plates $5a$, $5b$, and $5c$. These need not be contiguous, but may be spaced at random distances between the polarizing plates $2'$ and $3'$, the ammonium dihydrogen phosphate crystal $5a$ being located closest to polarizing plate $2'$. The surfaces of the ammonium dihydrogen phosphate crystal are coated with transparent films $7'$ and $8'$ of gold, similar to the electrode films 7 and 8 described with reference to Fig. 1 of the drawings. As in Fig. 1, the electrodes 7' and 8' are connected to the electrical control source 6'. The beam emerging from the analyzer 3' is collimated by means of the lens 17 which focuses it on a utility surface 4' which may, for example, be part of a photoelectric circuit.

It is to be understood that it is the relative, and not the absolute thicknesses of plates 5a, 5b, and 5c which is of critical interest in the embodiments of the present invention.

What is claimed is:

1. A divergence and color compensated light valve comprising a plurality of crystalline elements respectively including ammonium dihydrogen phosphate, zinc fluosilicate, and potassium periodate positioned in tandem, each of said crystalline elements having two substantially plane faces substantially perpendicular to a common optic axis, wherein the ratio between the respective thicknesses of the elements of zinc fluosilicate and ammonium dihydrogen phosphate approximates 2.17, and the ratio between the respective thicknesses of the elements of potassium periodate and ammonium dihydrogen phosphate approximates 0.56.

2. A divergence and color compensated light valve comprising in combination a plurality of crystalline elements including ammonium dihydrogen phosphate, zinc fluosilicate, and potassium periodate arranged in a tandem group, each of said elements cut with its major dimensions substantially perpendicular to a common optic axis, wherein the ratio between the thicknesses of zinc fluosilicate and ammonium dihydrogen phosphate approximates 2.17 and the ratio between the thicknesses of potassium periodate and ammonium dihydrogen phosphate approximates 0.55, translucent conducting electrodes attached to opposing surfaces of said ammonium dihydrogen phosphate element for impressing a controlling electrical field thereacross, polarizing elements arranged at opposite ends of said group, a light source, a collimating lens directing light from said source through a first one of said polarizing elements in the direction of the optic axis common to said crystalline elements, and means for utilizing light emerging from said crystal elements through the second one of said polarizing elements.

References Cited in the file of this patent

UNITED STATES PATENTS

| | | |
|---|---|---|
| 2,591,701 | Jaffe | Apr. 8, 1952 |
| 2,607,272 | Bond | Aug. 19, 1952 |
| 2,705,903 | Marshall | Apr. 12, 1955 |